C. WEBB.
APPARATUS FOR THE MANUFACTURE OF TASSELED BRAID.
APPLICATION FILED NOV. 25, 1914.

1,187,211. Patented June 13, 1916.

WITNESSES.

INVENTOR
Cyrus Webb
by

UNITED STATES PATENT OFFICE.

CYRUS WEBB, OF HAZEL GROVE, ENGLAND, ASSIGNOR TO THE HAT MANUFACTURERS SUPPLY COMPANY, LIMITED, OF STOCKPORT, ENGLAND.

APPARATUS FOR THE MANUFACTURE OF TASSELED BRAID.

1,187,211.   Specification of Letters Patent.   Patented June 13, 1916.

Application filed November 25, 1914. Serial No. 874,036.

*To all whom it may concern:*

Be it known that I, CYRUS WEBB, a British subject, residing at Hazel Grove, county of Chester, England, have invented certain new and useful Improvements in Apparatus for the Manufacture of Tasseled Braid, of which the following is a specification.

In the manufacture of tasseled braid that is short lengths of braid with floss at both ends for the manufacture of small bows or looped knots such as are employed for ornamenting the sweat bands of hats it is customary to cut the braid into lengths and tie or knot onto the ends a bunch of loose threads or flossed silk.

This invention consists in the formation of the braid from which the bows are made with spaces or lengths at intervals of loose or unbraided threads from which the tassel can be formed and in so constructing the braiding machine that at intervals it will draw forward a length of straight or unbraided threads which can be subsequently cut transversely to divide the braid into the required lengths and to form the tassel or floss at the end of such lengths.

The invention will be fully described with reference to the accompanying drawings.

Figure 1:
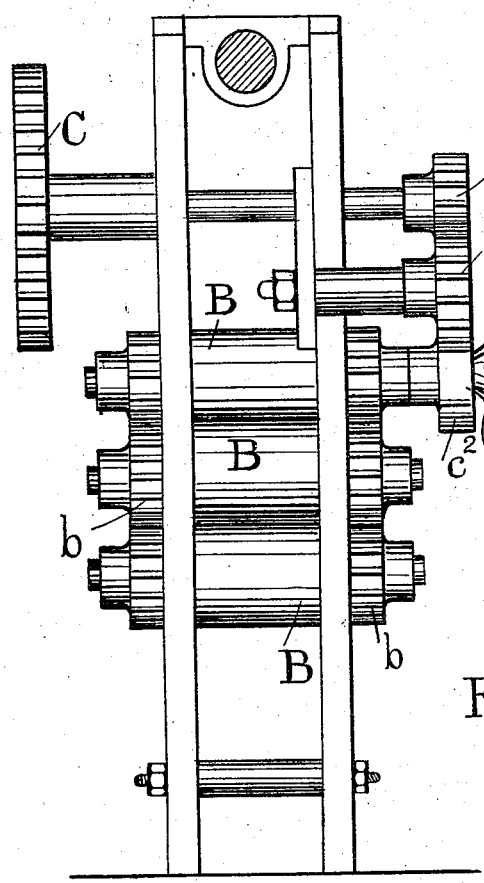
Figures 2, 3:
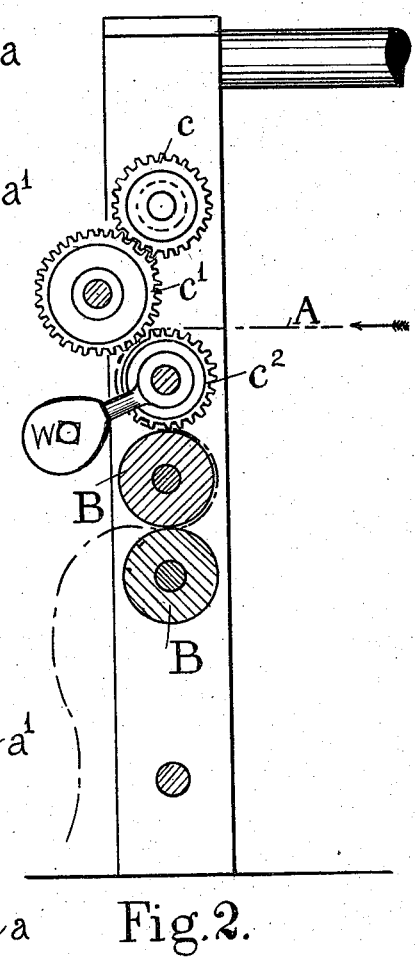
Figures 4, 5:
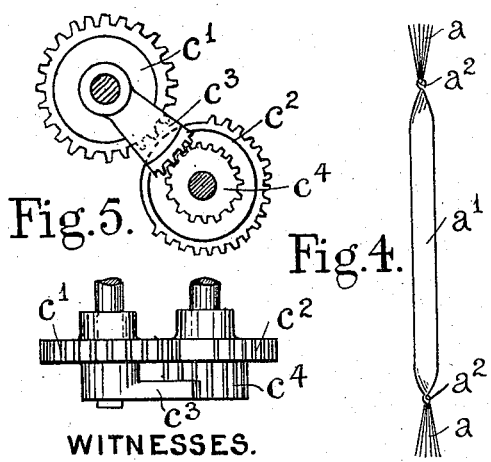
Figure 6:
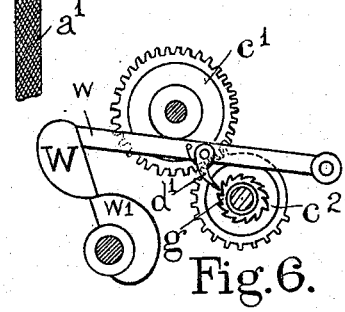

Figure 1. is a front elevation of the draw off or delivery rollers of a braiding machine. Fig. 2. is a transverse sectional elevation of same. Fig. 3. is a length of braid showing the unbraided portion at intervals. Fig. 4. is a length of finished tasseled braid. Fig. 5. is a modified construction of gearing. Fig. 6. is another modification of gearing.

For carrying out the invention I employ a braiding machine of known construction and which is not shown.

The braid A is drawn through the braiding machine in the usual way in the direction of the arrow shown by Fig. 2, by draw off rollers B and to these rollers during part of every revolution a greatly accelerated speed is imparted so as to draw through a portion $a$ of the threads without being braided thus producing a strip of braid A with a braided or plaited length $a'$ and a loose or unbraided length $a$ alternating with one another.

The rollers B are geared together by a train of wheels $b$ and are driven from any source of power by a wheel C and wheels $c$ $c'$ $c^2$. To effect the acceleration of the speed of the rollers B the last wheel $c^2$ of the train may be formed blank or without teeth for a portion of its periphery and provided with a weight W sufficiently heavy to rotate the rollers B. The rollers will be driven by the pinion $c'$ gearing with $c^2$ until the weight travels from the position shown in Fig. 2, to the upper side of the wheel. The gap in wheel $c^2$ then allows the weight to fall and wheel $c^2$ to rotate rapidly until the teeth reëngage thus driving the rollers at an accelerated speed and drawing through the desired length of unbraided material $a$.

In the modification shown in Fig. 5, the wheel $c'$ may be provided with a segment $c^3$ and the wheel $c^2$ with a second wheel $c^4$ by which the wheel $c^2$ and the rollers B will be driven at a higher speed for a part of a revolution drawing the threads $a$ through the machine unbraided.

In the modification shown in Fig. 6, the weight W is carried by a lever $w$ and raised by a cam $w'$ and the wheel $c^2$ is provided with a ratchet wheel $g$ with which a pawl $d'$ on the lever $w$ engages. The cam $w'$ raises the weight W and when the weight is released by the cam it carries the gapped portion of the wheel $c^2$ and with it the rollers at a rapid rate drawing the threads $a$ through the machine unbraided.

Any other suitable mechanism may be employed to give the rollers B a rapid movement at intervals to draw the threads $a$ through the machine unbraided. The braid A when completed is cut into lengths transversely through the center of the unbraided portion $a$ and knots $a^2$ tied thereon to form tassels at the ends.

What I claim as my invention and desire to protect by Letters Patent is:—

1. In a braiding machine the combination with the drawing off or delivery rollers and gearing for driving the same of a pinion without teeth over a portion of its periphery and means for imparting an accelerated speed to such pinion when it is out of gear by which an accelerated movement is imparted to the rollers to draw straight unbraided threads through the machine substantially as described.

2. In a braiding machine the combination with the drawing off or delivery rollers and gearing for driving the same of a pinion without teeth over a portion of its periphery and a weight connected therewith by which an accelerated movement is imparted to the rollers to draw straight unbraided threads through the machine.

In testimony whereof I have hereunto set my hand in presence of two subscribing witnesses, this 11th day of November 1914.

CYRUS WEBB.

Witnesses:
J. OWDEN O'BRIEN,
GEO. H. O'BRIEN.

Copies of this patent may be obtained for five cents each, by addressing the "Commissioner of Patents, Washington, D. C."